(12) United States Patent
Mullen

(10) Patent No.: US 10,397,516 B2
(45) Date of Patent: Aug. 27, 2019

(54) SYSTEMS, METHODS, AND DEVICES FOR SYNCHRONIZATION OF VEHICLE DATA WITH RECORDED AUDIO

(71) Applicant: Ford Global Technologies, LLC, Dearborn, MI (US)

(72) Inventor: Jonathan Thomas Mullen, Palo Alto, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 354 days.

(21) Appl. No.: 15/142,743

(22) Filed: Apr. 29, 2016

(65) Prior Publication Data

US 2017/0318257 A1    Nov. 2, 2017

(51) Int. Cl.
| | |
|---|---|
| H04N 5/93 | (2006.01) |
| G11B 27/00 | (2006.01) |
| G11B 27/031 | (2006.01) |
| G11B 27/10 | (2006.01) |
| H04N 5/04 | (2006.01) |
| H04N 5/08 | (2006.01) |
| H04N 9/802 | (2006.01) |
| G07C 5/08 | (2006.01) |

(52) U.S. Cl.
CPC .............. *H04N 5/9305* (2013.01); *G07C 5/08* (2013.01); *G11B 27/007* (2013.01); *G11B 27/031* (2013.01); *G11B 27/10* (2013.01); *H04N 5/04* (2013.01); *H04N 9/802* (2013.01); *G07C 5/0866* (2013.01)

(58) Field of Classification Search
CPC ........ H04N 5/04; H04N 5/9305; H04N 21/85; G07C 5/08; G07C 5/0841; G07C 5/0866; G11B 27/10; G11B 27/007; G11B 27/031
See application file for complete search history.

(56) References Cited

U.S. PATENT DOCUMENTS

| | | |
|---|---|---|
| 6,226,336 B1 | 5/2001 | Atarius |
| 7,983,811 B2 | 7/2011 | Basir |
| 8,457,323 B2 | 6/2013 | Palmestal |
| 2009/0012995 A1* | 1/2009 | Sartor ................. H04N 21/2187 |
| 2011/0085674 A1 | 4/2011 | Fujikawa |
| 2011/0295446 A1* | 12/2011 | Basir ....................... G07C 5/085 701/1 |
| 2012/0130580 A1* | 5/2012 | Omote ................... B60Q 5/008 701/22 |
| 2015/0105934 A1* | 4/2015 | Palmer ................. G07C 5/0841 701/1 |

FOREIGN PATENT DOCUMENTS

| | | |
|---|---|---|
| DE | 102005016323 B4 | 7/2013 |
| GB | 2354872 A | 4/2001 |

* cited by examiner

*Primary Examiner* — Gelek W Topgyal
(74) *Attorney, Agent, or Firm* — David R. Stevens; Stevens Law Group

(57) ABSTRACT

A method for post-processing to synchronize audio data with vehicle data includes generating an artificial sound data based on time-series vehicle data. The method includes determining an offset that maximizes cross-correlation between the artificial sound data and recorded audio data. The method also includes shifting one or more of the time-series data and the recorded audio data relative to each other in time based on the offset. The shift may be used to generate or render a synchronized set of time-series data and recorded audio data.

20 Claims, 4 Drawing Sheets

SYSTEMS, METHODS, AND DEVICES FOR SYNCHRONIZATION OF VEHICLE DATA WITH RECORDED AUDIO

TECHNICAL FIELD

The disclosure relates generally to methods, systems, and apparatuses for synchronization of vehicle data with recorded audio.

BACKGROUND

Modern vehicles include a wide array of sensors, computing systems, and communication capabilities. As automated and assisted driving technologies develop, these sensing, computing, and communication capabilities are likely to improve dramatically. During a driving event, current and future vehicles produce data about the vehicle including current conditions in or around the vehicle as well as status of one or more parts or systems. In addition to the data gathered by the vehicle, there may be audio and/or visual data of the vehicle captured by separate systems or devices. With the large amount of vehicle data and any recorded audio/visual data available, drivers, mechanics, or engineers have a large amount of information for analyzing or diagnosing vehicle performance or driving events. However, it is often difficult to correlate the recorded audio/visual data with the vehicle data, especially when they are captured by separate systems. What are needed are systems, methods, and devices for post-capture processing to synchronize vehicle data with audio/video streams.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
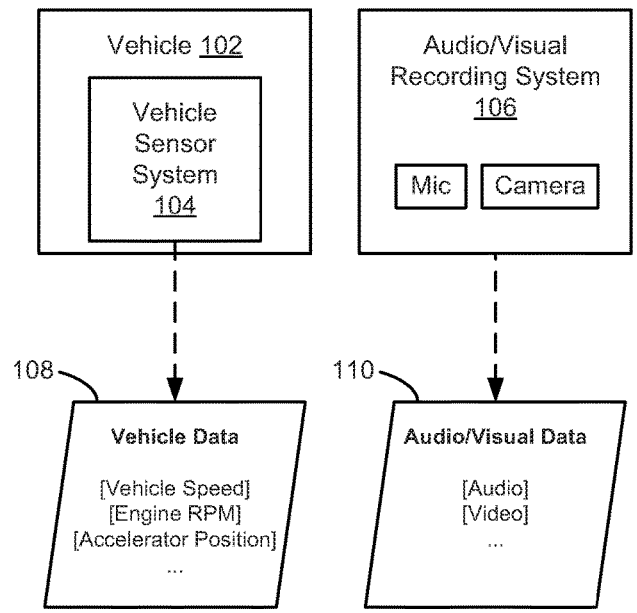
FIG. 1 is a schematic block diagram illustrating systems for generating or recording vehicle data and audio/visual data, according to one implementation.

Modern vehicles include a wide array of sensors, computing systems, and communication capabilities. As automated and assisted driving technologies develop, these sensing, computing, and communication capabilities are likely to improve dramatically. Thus, during driving, current and future vehicles produce data about the vehicle including current conditions in or around the vehicle as well as status of one or more parts or systems. In addition to the data gathered by the vehicle, there may be audio and/or visual data of the vehicle captured by separate systems or devices. For example, drivers may wear a helmet camera, or a dash camera or another camera may be installed or mounted in the vehicle or on a driver.

With vehicle data and any recorded audio/visual data, drivers, mechanics, or engineers have a large amount of information for analyzing or diagnoses vehicle performance or driving events. However, it is often difficult to correlate the recorded audio/visual data with the vehicle data, especially when they are captured by separate systems. For example, hardware for capturing audio/video streams and vehicle data may not have the ability to synchronize. Applicants have recognized that, in some applications, it may be desirable to synchronize these data sources after their capture.

In light of the foregoing, Applicants have developed systems, methods, and devices for post-capture processing to synchronize vehicle data with audio/video streams. According to one example embodiment, a method for post-processing to synchronize audio data with vehicle data includes generating an artificial sound data based on time-series vehicle data. The method includes determining an offset that maximizes cross-correlation between the artificial sound data and recorded audio data. The method also includes shifting one or more of the time-series data and the recorded audio data relative to each other in time based on the offset. The shift may be used to generate or render a synchronized set of time-series data and recorded audio data.

The problem of synchronizing two time series may be stated as finding the time offset $k_0$ between their beginnings. This disclosure presents an algorithm for synchronizing audio/video and vehicle data streams after their capture using a synthetic proxy sound. In one embodiment, the algorithm uses vehicle data that includes a measurement of engine speed or vehicle speed. For example, a measurement of engine speed or vehicle speed (represented as w[k]) may be available from the vehicle data stream. An engine speed may include data regarding the rotations-per-minute for the engine and/or an indirect indication of engine speed, such as the pedal position. The recorded audio/visual data may include an audio stream (represented as S[k]) that includes non-zero volume for the engine (e.g., engine speed), wind (e.g., cabin or external wind), and/or tire noise. For example, recorded data may include a video file that includes audio, which is synchronized with the video. The system may use a generative model that maps from w[k] (engine speed or vehicle speed) to an engine, wind, or tire sound proxy (represented S[k]).

In one embodiment, the system or method may generate a nominal sound (which may also be referred to herein as $\hat{S}[k]$, a sound proxy, a nominal sound, or an artificial sound) based on the vehicle time series data for engine speed or vehicle speed. The system or method may find the time offset $k_0$ that maximizes the cross-correlation between the engine sound, sound proxy $\hat{S}[k]$, and the audio stream, S[k]. In one embodiment, by synchronizing the audio stream with the sound proxy, the audio stream, and any related video, is thereby synchronized with the video data.

The foregoing method or system may generate the sound proxy $\hat{S}[k]$ using one or more of vehicle speed, engine speed or accelerator pedal position signals for w[k]. The system or method may use a model or method that maps w[k] to one or more of wind noise, engine noise, or tire noise. For example, wind noise may be present in S[k] and vehicle speed signal may use a model of wind noise to create a wind noise proxy Ŝ[k]. The system or method may find the time offset $k_0$ that maximizes the cross-correlation between the wind noise proxy Ŝ[k] and the engine speed S[k]. As another example, tire noise may be present in S[k] and the vehicle speed signal may use a model of wind noise to create a tire noise proxy Ŝ[k]. The system or method may find the time offset $k_0$ that maximizes the cross-correlation between the tire noise proxy Ŝ[k] and S[k].

Referring now to the figures, FIG. 1 illustrates generation of vehicle data 108 and audio/visual data 110. Vehicle data 108 may be generated by a vehicle 102 that includes a vehicle sensor system 104. The vehicle 102 may include any type of self-powered vehicle such as an automobile, off-road vehicle, boat, aerial vehicle, or the like. In one embodiment, the vehicle 102 may include an automated driving or assistance system for automated driving or assisting a human driver. The vehicle sensor system 104 may include a plurality of sensors for sensing the status, conditions, or environment of any aspect of the vehicle 102. In one embodiment, the vehicle sensor system 104 is a part of an automated driving or assistance system of the vehicle 102.

The vehicle data 108 produced by the vehicle sensor system 104 may include one or more parameters that relate to a velocity of a vehicle or a current speed of a motor or engine. Example parameters include a vehicle speed parameter, which may indicate the traveling speed of the vehicle with respect to a driving surface or medium. For example, the vehicle speed may indicate a road speed, air speed, water speed, or the like of the vehicle. The vehicle data 108 may include parameters that indicate an engine or motor speed. For example, the vehicle data 108 may include an engine rotations per minute (RPM) parameter and/or an accelerator position parameter. The vehicle data 108 may include a wide array of vehicle data. Example vehicle data may include any type of sensed data or status data for any part of a vehicle. For example, the vehicle data may include temperatures, operating status, age, wear status, or any other information about any portion, system, or part of the vehicle.

The audio/visual data 110 may be generated by an audio/visual recording system 106 that includes one or more microphones (mics) and/or one or more cameras. In one embodiment, the audio/visual recording system 106 includes a wearable camera system, such as a head or body mounted camera. In one embodiment, the audio/visual recording system 106 includes an in-vehicle mounted camera, such as a dash camera. In one embodiment, the audio/visual recording system 106 may include only an audio recording system and no video or image recording system. In one embodiment, audio/visual recording system 106 may record audio and video as part of a video recording. For example, the audio/visual recording system 106 may record synchronized audio and video for later playback.

Figure 2:
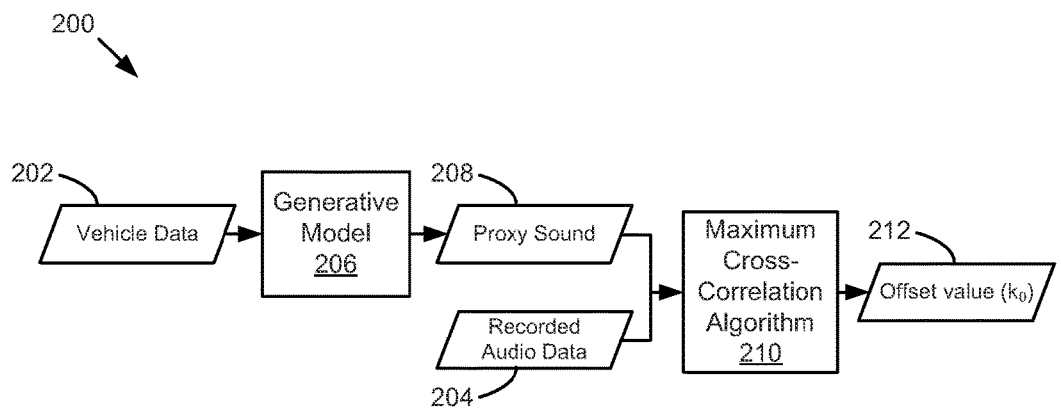
FIG. 2 is a schematic block diagram illustrating a method for synchronizing vehicle data with recorded audio data, according to one implementation.

FIG. 2 illustrates a method 200 for synchronizing vehicle data 202 with recorded audio data 204. The method 200 may be used as a post processing method to synchronize vehicle data with audio that has been separately recorded and/or is not synchronized in time with the audio data. Because data recorded by separate systems may not have synchronized clocks, time stamps, or other indications of a timing of recording may not be accurate enough to provide a synchronized view of the data.

The method 200 may include providing the vehicle data 202 as input into a generative model 206, which outputs a proxy sound 208. The generative model 206 may map at least a portion of the vehicle data 202 to an output sound. In one embodiment, the generative model 206 generates the proxy sound 208 by modifying an amplitude of an output sound based on values of the vehicle data. For example, the generative model 206 may scale the loudness of the proxy sound with the square of a vehicle speed parameter, engine RPM parameter, or accelerator position parameter of the vehicle data.

In one embodiment, the generative model 206 may use a base sound. The base sound may include a loop of a recorded sound that may be similar to a sound produced by or within a vehicle. For example, the base sound may include a recorded cabin noise within a vehicle where an engine, wind, and/or tire noise is audible. In one embodiment, the base sound may include a sound from a library of sounds that may be present in a vehicle environment. For example, the base sound may include a wind sound, a white noise sound, a tire sound, a gasoline engine sound, a diesel engine sound, an electric motor sound, a sound of a transmission or rotating interacting gears, and/or the like. The generative model 206 may loop the base sound and modulate the amplitude or loudness of the sound to track the changing value for a parameter in the vehicle data 202 to produce the proxy sound 208.

The parameters used to match the recorded audio data may include a vehicle speed, engine RPM, accelerator position, or any other parameter that may correlate direction or indirectly with a loudness of a type of sound produced in or around vehicle. For example, the RPM parameter and accelerator position parameter may provide direct or indirect indications of a speed of an engine or motor of the vehicle, or a speed of the vehicle itself. The engine, motor, or vehicle speed may correspond to a sound produced on or around the engine, motor, or vehicle. For example, the RPM parameter and accelerator position may indicate, directly or indirectly, the loudness of the noise produced by an engine, motor, or gears. As another example, the vehicle speed may provide a direct or indirect indication of one or more of tire noise, wind noise engine/motor noise produced by or around the vehicle.

The proxy sound 208 and the recorded audio data 204 may be provided as input to a maximum cross-correlation algorithm 210 that determines and outputs an offset value 212 ($k_0$). The maximum cross-correlation algorithm 210 may determine a value for $k_0$ that maximizes cross-correlation between the proxy sound 208 and the recorded audio data 204. Cross-correlation is a measure of similarity between two continuous or two discrete functions and may be used to match features in the proxy sound 208 and the recorded audio data 204. Example features, which may be detected and matched, include variations in the loudness of an engine sound, wind sound, tire noise, or the like. By matching features, an offset between the two sounds may be determined and precise synchronization performed. The offset value $k_0$ may be used during rendering to synchronize the two sources or may be used to generate a new version of the audio data or vehicle data that synchronized time stamps or start/stop times. In one embodiment, the offset value $k_0$ is used to generate a new file that includes synchronized vehicle data and audio.

It is important to note that, in the embodiments discussed herein, a proxy sound 208 need not perfectly match the recorded audio to obtain accurate synchronization. In fact, the proxy sound 208 may be a very poor representation of what is actually recorded by a microphone or camera system. For example, the proxy sound may not sound very similar to the recorded sound, at least to the human ear. However, if the proxy sound includes similar modulations of engine noise volume, for example, as the recorded sound, performing cross-correlation may still provide extremely accurate alignment between the proxy sound and recorded sound, and thus the vehicle data and the recorded sound (including any video/image data that is synchronized with the recorded sound). Thus, the generation of the proxy sound need not attempt to replicate the record sound: simulating how loudness of some sound (engine noise, motor noise, gear noise, wind noise, tire noise) in the recorded sound varies may provide sufficient detail to determine an accurate offset value $k_o$.

Figure 3:
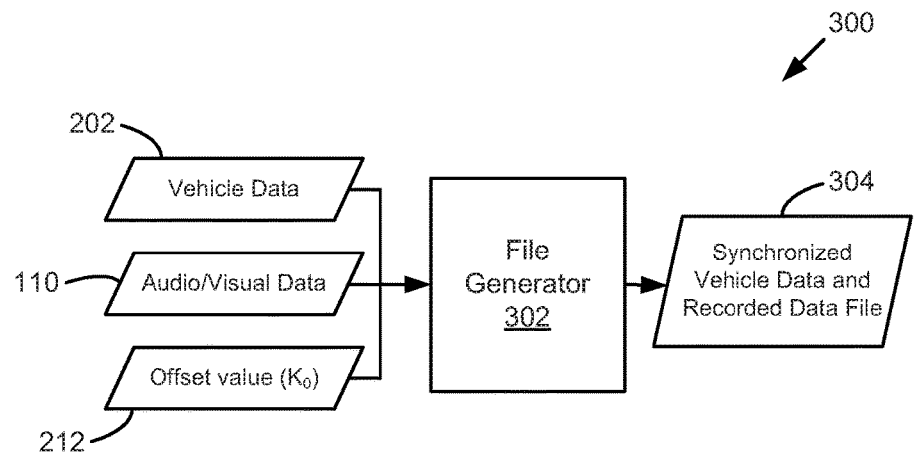
FIG. 3 is a schematic block diagram illustrating a method for generating synchronized vehicle data and recorded audio data, according to one implementation.

FIG. 3 illustrates a method 300 for generating a file that includes synchronized vehicle data 202 and audio/visual data 110. In the method, vehicle data 202, audio/visual data 110, and an offset value 212 ($k_o$) are provided as input into a file generator 302. The file generator 302 shifts one or more of the vehicle data 202 and the audio/visual data 110 in time (or at least with respect to each other) based on the offset value 212. For example, the file generator 302 may create one or more new files that have been adjusted to have start times that correspond to the same point in time, as determined based on the offset value 212. In one embodiment, the file generator 302 may generate a new file 304 that contains data from both the vehicle data 202 and the audio/visual data 110 that has been shifted based on the offset value 212. In one embodiment, the offset value 212 is stored with one or more of the vehicle data 202 and audio/visual data 110 so that playback of the audio/visual data 110 and/or the vehicle data 202 may be shifted based on the offset value 212. If the audio/visual data 110 includes video, the file may include both the recorded audio and recorded video or image files.

Figure 4:
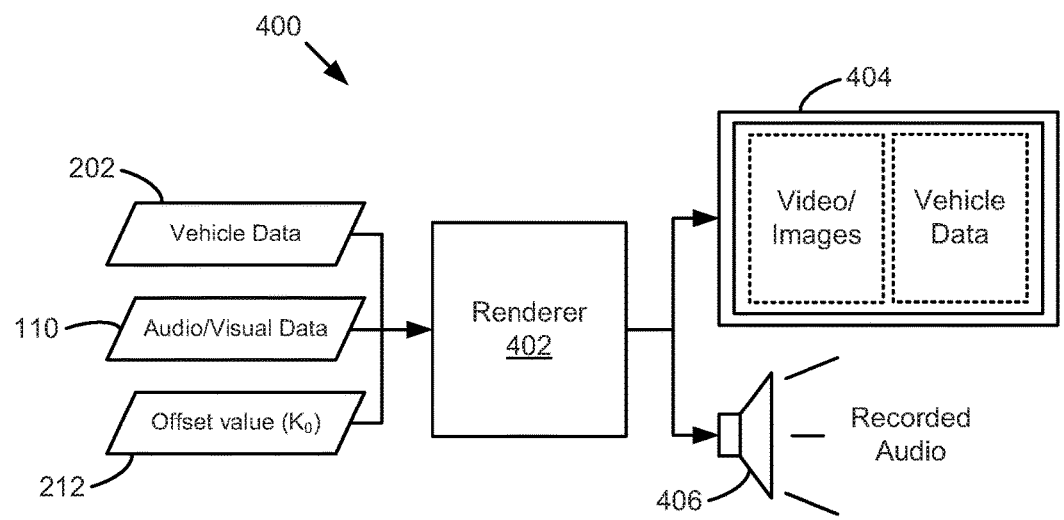
FIG. 4 is a schematic block diagram illustrating a method for rendering synchronized vehicle data with recorded audio data, according to one implementation.

FIG. 4 illustrates a method 400 for rendering synchronized vehicle data 202 and audio/visual data 110. In the method 400, the vehicle data 202, the audio/visual data 110, and the offset value 212 ($k_o$) are provided as input to a renderer 402. The renderer 402 may include one or more of software, interface drivers, and/or hardware drivers for rendering visual data as images or graphics and audio data as sounds. The renderer 402 may delay, advance, or otherwise time shift rendering of the vehicle data 202, the video data, and/or the audio data based on the offset value 212. In one embodiment, the renderer 402 may display any video/images from the audio/visual data 110 and the vehicle data 202 on a display 404 and any audio data on a speaker 406. For example, the renderer 402 may render video/images on the display 404 in a first portion of the display while rendering a portion of vehicle data that corresponds to currently displayed video/images. Similarly, recorded audio may also be played in a synchronized manner such that audio, video, and vehicle data 202 that correspond to a same time or moment in time, as determined by the offset value 212, is all rendered substantially at the same time.

Figure 5:
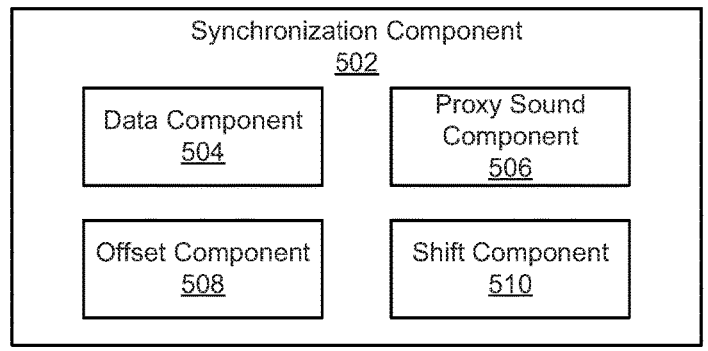
FIG. 5 is a schematic block diagram illustrating example components of a synchronization component, according to one implementation.

FIG. 5 is a block diagram illustrating example components of a synchronization component 502, according to one implementation. In the depicted embodiment, the synchronization component 502 includes a data component 504, a proxy sound component 506, an offset component 508, and a shift component 510. The components 504-510 are given by way of illustration only and may not all be included in all embodiments. In fact, some embodiments may include only one or any combination of two or more of the components 504-510. Furthermore, some of the components 504-510 may be located outside the synchronization component 502, or within another system or computing device.

The data component 504 is configured to obtain and/or store data for synchronization. For example, the data component 504 may include data storage for receiving and storing vehicle data 202, audio/visual data 110, and/or an offset value 212. In one embodiment, the data component 504 may receive data recorded or generated by a vehicle sensor system, such as the vehicle sensor system 104, and/or an audio/visual recording system, such as the audio/visual recording system 106. In one embodiment, the vehicle data 202 includes time-series data produced by one or more vehicle sensors or control systems of a vehicle during a driving period. The audio/visual data 110 may include audio data recorded during the driving period.

The proxy sound component 506 is configured to generate a proxy sound based on vehicle data 202. In one embodiment, the proxy sound component 506 uses the generative model 206 of FIG. 2 to generate a proxy sound or artificial sound based on time-series data generated by vehicle sensors, a vehicle control system, or the like. The vehicle or time-series data may include an engine speed, vehicle speed, accelerator pedal position, or any other vehicle data discussed herein.

The proxy sound component 506 is configured to generate the proxy sound data based on one or more of the engine speed and the vehicle speed. For example, the proxy sound component 506 may generate the proxy sound data by modifying an amplitude of a sound (e.g., a separate pre-corded, template sound, or artificially generated sound) based on a value of a portion of the time-series data. For example, the proxy sound component 506 may generate or loop white noise sound while increasing and/or decreasing the loudness of the sound based on an increase or decrease in vehicle speed to simulate wind speed. Similar processes may be performed to simulate engine noise, tire noise, etc. In one embodiment, the proxy sound component 506 modifies the amplitude of a base sound to replicate one or more of an engine noise, internal cabin noise, external wind noise, and/or tire noise. In one embodiment, the proxy sound component 506 may generate a proxy sound that includes a plurality of combined proxy sounds for different types of sound that may be present. For example, a single proxy sound may simulate variations in engine/motor loudness, wind noise, and/or tire noise.

The offset component 508 is configured to determine an offset that maximizes cross-correlation between proxy sound data and recorded audio data. The proxy sound may include an artificially generated sound data created or generated by the proxy sound component 506. The recorded audio data may include audio data from a video recording so that determining an offset respective to the audio data effectively determines an offset for the video. The offset component may implement the maximum cross-correlation algorithm 210 to determine the offset between the proxy sound and the recorded audio data. For example, the offset component 508 may match one or more features in the proxy sound data with one or more features in the recorded audio data. Based on a time offset between the features, the offset component 508 may determine an offset value that can be used to shift and align the features.

The shift component 510 is configured to shift the vehicle data (such as time-series sensor data) and/or the recorded audio data relative to each other by the offset value 212, such as the offset value determined by the offset component 508. For example, the shift component 510 may shift the vehicle data 202 by the full offset value 212, may shift the recorded audio data by the full offset value 212, or shift both the vehicle data 202 and the recorded audio data by a portion of the offset value 212. In one embodiment, the shift component 510 may shift the vehicle data 202 or recorded audio data by modifying one or more time stamps.

In one embodiment, the shift component 510 may shift by clipping and/or discarding a portion of the vehicle data 202 or recorded audio data corresponding to the length of the offset value 212. In one embodiment, the shift component 510 is configured to shift time-series vehicle data 202 and recorded audio data relative to each other in time based on the offset to generate a synchronized set of time-series data and recorded audio data. In one embodiment, the shift component 510 may shift playback or rendering of the audio data, data related to the audio data (such as video or images), or vehicle time-series data during display/rendering of the vehicle data 202. For example, the shift component 510 may cause at least a portion of audio data, or video/image data corresponding to the audio data, to be rendered on a display 404 or speaker 406 while displaying time-series vehicle data that corresponds to the audio data and/or video/image data that is currently being displayed. In one embodiment, the shift component 510 may render at least a portion of the video data that corresponds to the audio data used to generate the offset and, during rendering a portion of the video data, determine and display a portion of the time-series data corresponding to the portion of the video data based on the offset. In one embodiment, the shift component 510 may include one or more of the file generator 302 of FIG. 3 and the renderer 402 of FIG. 4.

Figure 6:
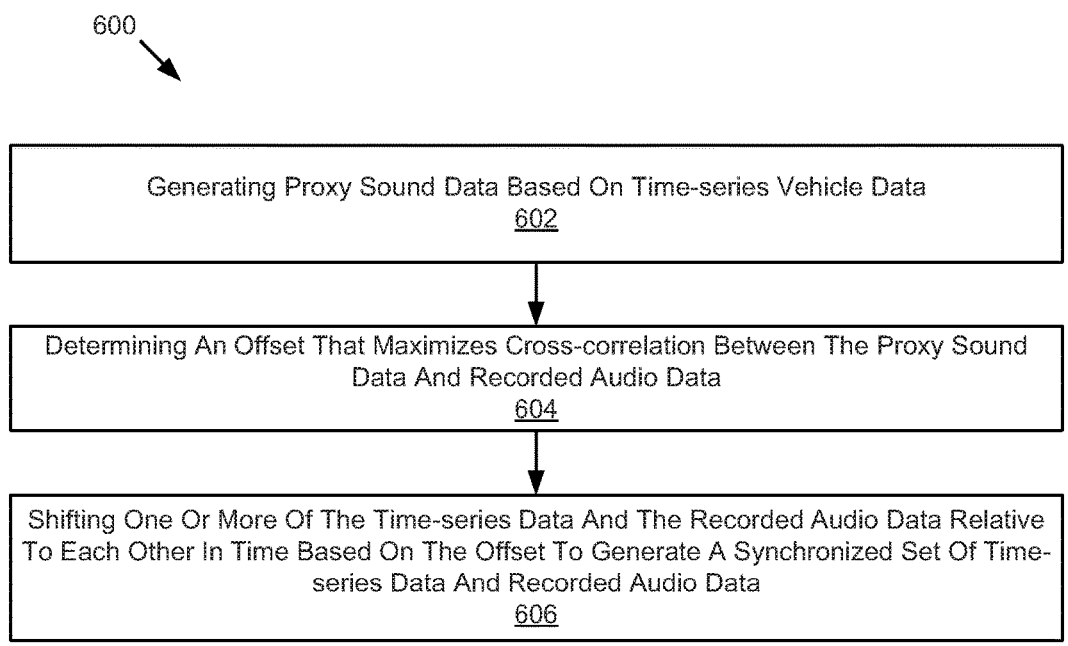
FIG. 6 is a schematic flow chart diagram illustrating a method for synchronizing time-series vehicle data and recorded audio data, according to one implementation.

Referring now to FIG. 6, a schematic flow chart diagram of a method 600 for synchronizing vehicle data and recorded audio data is illustrated. The method 600 may be performed by a synchronization component, such as the synchronization component 502 of FIG. 5.

The method 600 begins and a proxy sound component 506 generates at 602 a proxy sound data based on time-series vehicle data. An offset component 508 determines at 604 an offset that maximizes cross-correlation between the proxy sound data and recorded audio data. A shift component 510 shifts at 606 one or more of the time-series data and the recorded audio data relative to each other in time based on the offset to generate a synchronized set of time-series data and recorded audio data. Shifting may occur during rendering, during generation of new versions of video files, and/or during generation of a combined file that includes both vehicle data and recorded audio, video, or images.

Figure 7:
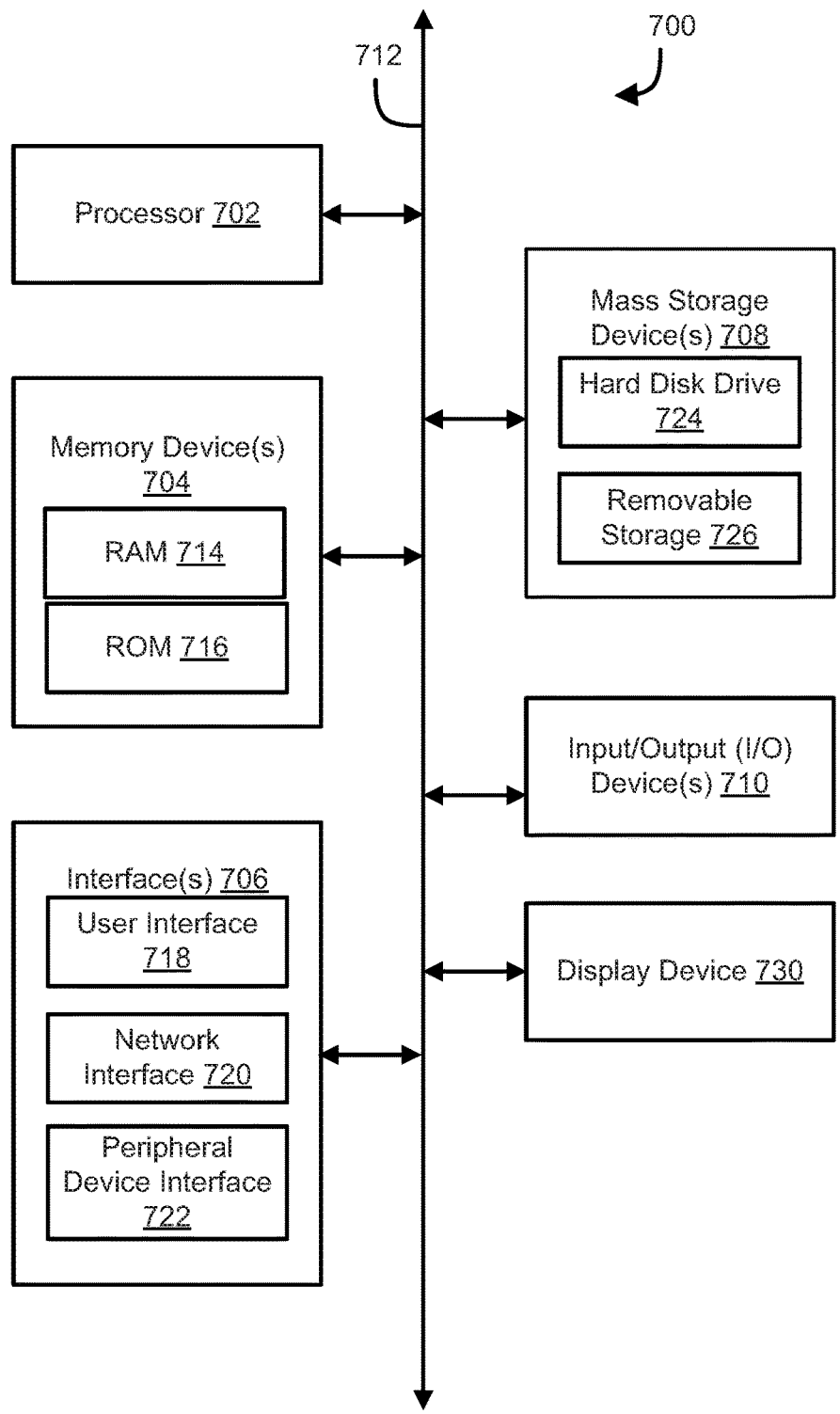
FIG. 7 illustrates a block diagram of an example computing device in accordance with the teachings and principles of the disclosure.

Referring now to FIG. 7, a block diagram of an example computing device 700 is illustrated. Computing device 700 may be used to perform various procedures, such as those discussed herein in relation to FIGS. 1-6. For example, the synchronization component 502 of FIG. 5 may include one, more, or all of the components of the example computing device 700. Computing device 700 can function as a server, a client, or any other computing entity. Computing device 700 can perform various monitoring functions as discussed herein, and can execute one or more application programs, such as the application programs described herein. Computing device 700 can be any of a wide variety of computing devices, such as a desktop computer, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 includes various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 includes various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, and the like.

Display device 730 includes any type of device capable of displaying information to one or more users of computing device 700. Examples of the display device 730 include a monitor, display terminal, video projection device, and the like.

Interface(s) 706 includes various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1374 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Examples

The following examples pertain to further embodiments.

Example 1 is a method for post-processing audio data with vehicle data to synchronize the audio data and vehicle data (or any data related or synchronized with the audio data and video data). The method includes generating proxy sound data based on time-series vehicle data. The method includes determining an offset that maximizes cross-correlation between the proxy sound data and recorded audio data. The method includes shifting one or more of the time-series data and the recorded audio data relative to each other in time based on the offset to generate a synchronized set of time-series data and recorded audio data.

In Example 2, generating the proxy sound data in Example 1 includes modifying an amplitude of a sound based on a value of a portion of the time-series data.

In Example 3, modifying the amplitude of the sound in Example 2 includes modifying an amplitude of a looping generic sound, wherein the looping generic sound replicates a sound of one or more of an engine noise, internal cabin noise, external wind noise, and/or tire noise.

In Example 4, generating the proxy sound data in any of Examples 1-3 includes generating a proxy sound to simulate one or more of: an engine sound; a motor sound; a wind sound; and a tire sound.

In Example 5, the time-series data in any of Examples 1-4 includes data for one or more of an engine speed and a vehicle speed, wherein generating the proxy sound data comprises generating based on one or more of the engine speed and the vehicle speed.

In Example 6, shifting one or more of the vehicle time series data and the recorded audio data in time based on the offset in any of Examples 1-5 includes shifting during rendering of one or more of: the recorded audio data; or image or video data corresponding to the audio data.

In Example 7, shifting one or more of the vehicle time series data and the recorded audio data in time based on the offset in any of Examples 1-6 includes one or more of: modifying a time signature of one or more of the time-series data and the recorded audio data; storing the offset with one or more of the time-series data and the recorded audio data; and generating a file that correlates portions of the time-series data with a corresponding audio or video data based on the offset, wherein the recorded audio data comprises audio data from the video recording.

In Example 8, the time-series data in any of Examples 1-7 includes data produced by one or more vehicle sensors or control systems of a vehicle during a driving period and the recorded audio data includes audio data recorded during the driving period.

Example 9 is a system or device that includes a proxy sound component, an offset component, and a shift component. The proxy sound component is configured to generate proxy sound data based on time-series vehicle data. The offset component is configured to determine an offset that maximizes cross-correlation between the proxy sound data and recorded audio data. The shift component is configured to shift one or more of the vehicle time series data and the recorded audio data in time based on the offset to generate a synchronized set of time series data and audio data. The time-series data includes data produced by one or more vehicle sensors or control systems of the vehicle during a driving period and the recorded audio data includes audio data recorded during the driving period.

In Example 10, the proxy sound component in Example 9 is configured to generate the proxy sound data by modifying an amplitude of a sound based on a value of a portion of the time-series data.

In Example 11, the proxy sound component in Example 9 is configured to modify the amplitude of the sound by modifying an amplitude of a looping generic sound, wherein the looping generic sound replicates a sound of one or more of an engine noise, internal cabin noise, external wind noise, and/or tire noise.

In Example 12, the proxy sound component in any of Examples 9-11 is configured to generate the proxy sound data by generating a proxy sound to simulate one or more of: an engine sound; a wind sound; and a tire sound.

In Example 13, the time-series data in any of Examples 9-12 includes data for one or more of an engine speed and a vehicle speed, wherein the proxy sound component is configured to generate the proxy sound data by generating based on one or more of the engine speed and the vehicle speed.

In Example 14, the shift component in any of Examples 9-13 is configured to shift one or more of the vehicle time series data and the recorded audio data in time based on the offset by shifting during rendering of one or more of: the recorded audio data; or image or video data corresponding to the audio data.

In Example 15, the shift component in any of Examples 9-14 is configured to shift one or more of the vehicle time series data and the recorded audio data in time by one or more of: modifying a time signature of one or more of the time-series data and the recorded audio data; storing the offset with one or more of the time-series data and the recorded audio data; and generating a file that correlates portions of the time-series data with a corresponding audio or video data based on the offset, wherein the recorded audio data comprises audio data from the video recording.

Example 16 is a method that includes generating proxy sound data based on time-series vehicle data produced by one or more vehicle sensors or control systems of the vehicle during a driving period. The method includes determining an offset that maximizes cross-correlation between the proxy sound data and recorded audio data, wherein the recorded audio data comprises audio from video data recorded during the driving period. The method includes rendering at least a portion of the video data. The method includes, during rendering a portion of the video data, determining and display a portion of the time-series data corresponding to the portion of the video data based on the offset.

In Example 17, generating the proxy sound data in Example 16 includes modifying an amplitude of a sound over time based on a value of a portion of the time-series data over time.

In Example 18, modifying the amplitude of the sound in Example 17 includes modifying an amplitude of a looping generic sound, wherein the looping generic sound replicates a sound of one or more of an engine noise, internal cabin noise, external wind noise, and/or tire noise.

In Example 19, the time-series data in any of Examples 16-18 includes data for one or more of an engine speed and a vehicle speed, generating the proxy sound data includes generating based on one or more of the engine speed and the vehicle speed.

In Example 20, determining the offset that maximizes cross-correlation in any of Examples 16-19 includes matching one or more features in the proxy sound data with one or more features in the recorded audio data and determining the offset to match the one or more features in the proxy sound data with the one or more features in the recorded audio data in time.

Example 21 is computer readable storage media storing instructions that, when executed by one or more processors, cause the processors to implement a method or realize a system or device as in any of Examples 1-20

Example 22 is a system or device that includes means for implementing a method, system, or device as in any of Examples 1-21.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

The terms "component" or "module" used herein are used to indicate their implementation independence. Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
    determining an engine speed based on time-series vehicle data;
    determining recorded audio data comprising a vehicle noise having non-zero volume;
    generating proxy sound data comprising a proxy vehicle noise synthesized based on the engine speed;
    determining an offset that maximizes cross-correlation between the proxy sound data and the recorded audio data; and
    shifting one or more of the time-series vehicle data or the recorded audio data relative to each other in time based on the offset to generate a synchronized set of time-series vehicle data and recorded audio data.

2. The method of claim 1, wherein generating the proxy sound data comprises modifying an amplitude of a sound based on a value of a portion of the time-series vehicle data.

3. The method of claim 2, wherein modifying the amplitude of the sound comprises modifying an amplitude of a looping generic sound, wherein the looping generic sound replicates a sound of one or more of an engine noise, internal cabin noise, external wind noise, and/or tire noise.

4. The method of claim 1, wherein the vehicle noise having non-zero volume comprises one or more of engine noise, tire noise, or wind noise, and wherein generating the proxy sound data comprises generating a proxy sound to simulate the vehicle noise and comprises one or more of:
    a proxy engine noise;
    a proxy wind noise; or
    a proxy tire noise.

5. The method of claim 1, wherein the time-series vehicle data further comprises data for a vehicle speed and a vehicle accelerator pedal signal, and wherein generating the proxy sound data comprises generating based on the engine speed and one or more of the vehicle speed or the vehicle accelerator pedal signal.

6. The method of claim 1, wherein shifting one or more of the time-series vehicle data and the recorded audio data in time based on the offset comprises shifting during rendering of one or more of:
    the recorded audio data; or
    image or video data corresponding to the audio data.

7. The method of claim 1, wherein shifting one or more of the time-series vehicle data and the recorded audio data in time based on the offset comprises one or more of:
    modifying a time signature of one or more of the time-series vehicle data and the recorded audio data;
    storing the offset with one or more of the time-series vehicle data or the recorded audio data; and
    generating a file that correlates portions of the time-series vehicle data with a corresponding audio or video data based on the offset, wherein the recorded audio data comprises audio data from the video recording.

8. The method of claim 1, wherein the time-series vehicle data comprises data produced by one or more vehicle sensors or control systems of a vehicle during a driving period and the recorded audio data comprises audio data recorded during the driving period.

9. A system comprising:
    a microphone of a vehicle;
    one or more vehicle sensors for capturing time-series vehicle data; and
    a processor that is programmable to execute instructions stored in non-transitory computer readable storage media, the instructions comprising:
        determining an engine speed based on the time-series vehicle data;
        receiving recorded audio data from the microphone comprising a vehicle noise having non-zero volume;
        generating proxy sound data comprising a proxy vehicle noise synthesized based on the engine speed;
        determining an offset that maximizes cross-correlation between the proxy sound data and the recorded audio data; and
        shifting one or more of the time-series vehicle data or the recorded audio data relative to each other in time based on the offset to generate a synchronized set of time-series vehicle data and recorded audio data.

10. The system of claim 9, wherein generating the proxy sound data comprises modifying an amplitude of a sound based on a value of a portion of the time-series vehicle data.

11. The system of claim 10, wherein modifying the amplitude of the sound comprises modifying an amplitude of a looping generic sound, wherein the looping generic sound replicates a sound of one or more of an engine noise, internal cabin noise, external wind noise, and/or tire noise.

12. The system of claim 9, wherein the vehicle noise having non-zero volume comprises one or more of engine noise, tire noise, or wind noise, and wherein generating the proxy sound data comprises generating a proxy sound to simulate the vehicle noise and comprises one or more of:
    a proxy engine noise;
    a proxy wind noise; or
    a proxy tire noise.

13. The system of claim 9, wherein the time-series vehicle data further comprises data for vehicle speed and a vehicle accelerator pedal signal, and wherein the proxy sound component is configured to generate the proxy sound data by generating based on the engine speed and one or more of the vehicle speed or the vehicle accelerator pedal signal.

14. The system of claim 9, wherein shifting one or more of the time-series vehicle data and the recorded audio data in time based on the offset comprises shifting during rendering of one or more of:
the recorded audio data; or
image or video data corresponding to the audio data.

15. The system of claim 9, wherein shifting one or more of the time-series vehicle data and the recorded audio data in time comprises one or more of:
modifying a time signature of one or more of the time-series vehicle data and the recorded audio data;
storing the offset with one or more of the time-series vehicle data or the recorded audio data; and
generating a file that correlates portions of the time-series vehicle data with a corresponding audio or video data based on the offset, wherein the recorded audio data comprises audio data from the video recording.

16. Non-transitory computer readable storage media storing instructions that, when executed by one or more processors, cause the one or more processors to:
determine an engine speed based on time-series vehicle data;
determine recorded audio data comprises a vehicle noise having non-zero volume;
generate proxy sound data comprises a proxy vehicle noise synthesized based on the engine speed;
determine an offset that maximizes cross-correlation between the proxy sound data and the recorded audio data; and
shift one or more of the time-series vehicle data or the recorded audio data relative to each other in time based on the offset to generate a synchronized set of time-series vehicle data and recorded audio data.

17. The non-transitory computer readable media of claim 16, wherein the instructions cause the one or more processors to generate the proxy sound data by modifying an amplitude of a sound over time based on a value of a portion of the time-series vehicle data over time.

18. The non-transitory computer readable media of claim 17, wherein the instructions cause the one or more processors to modify the amplitude of the sound by modifying an amplitude of a looping generic sound, wherein the looping generic sound replicates a sound of one or more of an engine noise, internal cabin noise, external wind noise, and/or tire noise.

19. The non-transitory computer readable media of claim 16, wherein the vehicle noise having non-zero volume comprises one or more of engine noise, tire noise, or wind noise, and wherein generating the proxy sound data comprises a proxy sound to simulate the vehicle noise and comprises one or more of a proxy engine noise, a proxy wind noise, or a proxy tire noise.

20. The non-transitory computer readable media of claim 16, wherein the instructions cause the one or more processors to determine the offset that maximizes cross-correlation by matching one or more features in the proxy sound data with one or more features in the recorded audio data and determining the offset to match the one or more features in the proxy sound data with the one or more features in the recorded audio data in time.

* * * * *